(12) United States Patent
Slabaugh et al.

(10) Patent No.: US 8,069,022 B2
(45) Date of Patent: Nov. 29, 2011

(54) METHOD AND APPARATUS FOR THE CLASSIFICATION OF SURFACE FEATURES OF AN EAR IMPRESSION

(75) Inventors: Gregory G. Slabaugh, Princeton, NJ (US); Gozde Unal, West Windsor, NJ (US); Tong Fang, Morganville, NJ (US)

(73) Assignee: Siemens Corporation, Iselin, NJ (US)

( * ) Notice: Subject to any disclaimer, the term of this patent is extended or adjusted under 35 U.S.C. 154(b) by 1273 days.

(21) Appl. No.: 11/465,628

(22) Filed: Aug. 18, 2006

(65) Prior Publication Data

US 2007/0127754 A1 Jun. 7, 2007

Related U.S. Application Data

(60) Provisional application No. 60/742,991, filed on Dec. 7, 2005.

(51) Int. Cl.
*G06G 17/50* (2006.01)
*G06G 7/48* (2006.01)
*H04R 25/00* (2006.01)

(52) U.S. Cl. ............... 703/7; 703/1; 381/23.1; 381/312; 381/322

(58) Field of Classification Search .............. 703/1, 7; 381/23.1, 312, 322
See application file for complete search history.

(56) References Cited

U.S. PATENT DOCUMENTS

| 4,953,112 A * | 8/1990 | Widin et al. ............... 703/6 |
| 6,920,414 B2 * | 7/2005 | Topholm .................. 703/1 |
| 7,084,870 B2 * | 8/2006 | Fang et al. ............... 345/420 |
| 7,286,679 B2 * | 10/2007 | Fang et al. ............... 381/322 |
| 2004/0165741 A1 * | 8/2004 | Fang et al. ............... 381/322 |

FOREIGN PATENT DOCUMENTS

WO    WO 02/21894 A    3/2002

OTHER PUBLICATIONS

"Matching with Shape Contexts", Belongie et al. 2000 IEEE.*
"Shape Matching and Object Recognition Using Shape Contexts", Belongie et al. IEEE Apr. 2002.*
"Matching Shapes", Belongie et al. IEEE Jul. 2001.*
"Automatic Construction of Multiple-Object Three-Dimensional Statistical Shape Models: Application to Cardiac Modeling", Frangi et al. IEEE Sep. 2002.*
"Evaluation of Atlas Selection Strategies for Atlas-based Image Segmentation with Application to Confocal Microscopy Images of Bee Brains", Rohlfing et al. Elsevier Inc, Nov. 2003.*

(Continued)

*Primary Examiner* — Paul Rodriguez
*Assistant Examiner* — Nithya Janakiraman

(57) ABSTRACT

A method and apparatus is disclosed whereby a point on an ear impression model to be labeled is selected and a shape context is determined for that point. This shape context is then compared to average shape contexts for different regions on a reference ear impression model, also referred to herein as an ear impression shape atlas. A cost function is used to determine the minimum cost between the shape context for the selected point and one of the average shape contexts. Once the minimized cost is determined, the region label corresponding to the average shape context having a minimized cost is assigned to that point. In this way, points on the surface of an ear impression are classified and labeled as being located in regions corresponding to the regions on the ear impression shape atlas.

29 Claims, 10 Drawing Sheets

OTHER PUBLICATIONS

"Discriminatory Power of Handwritten Words for Writer Recognition", Tomai et al. ICPR 2004.*

"Shape-Based 3D Surface Correspondence Using Geodesics and Local Geometry", Wang et al. IEEE 2000.*

Moghaddam, Baback et al., "Model-Based 3D Face Capture with Shape-From-Silhouettes," *Proceedings of the OEEE International Workshop on Analysis and Modeling of Faces and Gestures*, (2003).

Slabaugh, Greg et al., "A Contour-Based Approach to 3D Text Labeling on Triangulated Surfaces," *Proceedings of the Fifth International Conference on 3-D Digital Imaging and Modeling*, (2005).

European Search Report (Mar. 22, 2007).

S. Belongie, et al., "Shape Matching and Object Recognition Using Shape Contexts", IEEE Transactions on Pattern Analysis and Machine intelligence, vol. 24, No. 24, Apr. 2002, pp. 509-522.

A. B. Hanza, et al., "Geodesic Object Representation and Recognition", Department of Electrical and Computer Engineering, Springer-Verlag, 2003, pp. 378-387.

M. Hilaga, et al., "Topology Matching for Fully Automatic Similarity Estimation of 3D Shapes", Proc. of the 28th Annual Conference on Computer Graphics and Interactive Techniques, 2001, pp. 203-212.

Y. Shinagawa, at al., "Surface Coding Based on Morse Theory", IEEE Computer Graphics and Applications, vol. 11, Issue 5, 1991, pp. 66-78.

Tung, et al., "Augmented Reeb Graphs for Content-Based Retrieval of 3D Mesh Models", Proceedings Shape Modeling Applications, 2004, pp. 157-166.

M. Körtgen, et al., "3D Shape Matching with 3D Shape Contexts", Proc. of the 7th Central European Seminar on Computer Graphics, Slovakia, Apr. 23, 2003.

* cited by examiner

METHOD AND APPARATUS FOR THE CLASSIFICATION OF SURFACE FEATURES OF AN EAR IMPRESSION

This patent application claims the benefit of U.S. Provisional Application No. 60/742,991, filed Dec. 7, 2005, which is hereby incorporated by reference herein in its entirety.

BACKGROUND OF THE INVENTION

The present invention relates generally to the identification of features on three-dimensional objects and, more particularly, on three-dimensional ear impression models.

The manufacturing of medical devices designed to conform to anatomical shapes, such as hearing aids, has traditionally been a manually intensive process due to the complexity of the shape of the devices. FIG. 1A shows a diagram of a human ear that is, for example, the ear of a patient requiring a hearing aid. Specifically, ear 100 has various identifiable parts, or features, such as, for example, aperture 102, crus 103, canal 104, concha 105 and cymba 106. As one skilled in the art will recognize, in order to produce a hearing aid for the patient, an ear impression is typically taken. Various processes for taking such ear impressions have been developed, but most such processes typically involve inserting a pliable material into an ear and allowing that material to harden so that, when it is removed, the contours of the different parts of the ear, such as parts 102-106 of FIG. 1A, are accurately reflected on the impression. Such an ear impression reflecting the parts of ear 100 of FIG. 1A is shown in FIG. 1B. More particularly, ear impression 101 has aperture portion 102A corresponding to aperture 102 of FIG. 1A; crus portion 103A corresponding to crus 103 of FIG. 1A; canal portion 104A corresponding to canal 104 in FIG. 1A; concha portion 105A corresponding to concha 105 of FIG. 1A; cymba portion 106A corresponding to cymba 106; and lower body portion 107A.

Different methods have been used to create ear molds, or shells, from ear impressions. One skilled in the art will recognize that the terms ear mold and ear shell are used interchangeably and refer to the housing that is designed to be inserted into an ear and which contains the electronics of a hearing aid. Traditional methods of manufacturing such hearing aid shells typically require significant manual processing to fit the hearing aid to a patient's ear by, for example, manually identifying the various features of each ear impression. Then, an ear mold could be created by sanding or otherwise removing material from the shell in order to permit it to conform better to the patient's ear. More recently, however, attempts have been made to create more automated manufacturing methods for hearing aid shells. In some such attempts, ear impressions are digitized and then entered into a computer for processing and editing. The result is a digitized model of the ear impressions that can then be digitally manipulated. One way of obtaining such a digitized model uses a three-dimensional laser scanner, which is well known in the art, to scan the surface of the impression both horizontally and vertically. Another way of obtaining digitized models uses structured light scanning, which is also well known in the art. Whatever the method used to scan an ear impression, the result is a digitized model of the ear impression having a plurality of points, referred to herein as a point cloud representation, forming a graphical image of the impression in three-dimensional space. FIG. 2 shows an illustrative point cloud graphical representation 201 of the hearing aid impression 101 of FIG. 1B. As one skilled in the art will recognize, the number of points in this graphical point cloud representation is directly proportional to the resolution of the laser scanning process used to scan the impression. For example, such scanning may produce a point cloud representation of a typical ear impression that has 30,000 points.

Once such a digitized model of an ear shell has been thus created, then various computer-based software tools have been used to manually edit the graphical shape of each ear impression individually to, for example, create a model of a desired type of hearing aid for that ear. As one skilled in the art will recognize, such types of hearing aids may include in-the-ear (ITE) hearing aids, in-the-canal (ITC) hearing aids, completely-in-the-canal (CIC) hearing aids and other types of hearing aids. Each type of hearing aid requires different editing of the graphical model in order to create an image of a desired hearing aid shell size and shape according to various requirements. These requirements may originate from a physician, from the size of the electronic hearing aid components to be inserted into the shell or, alternatively, may originate from a patient's desire for specific aesthetic and ergonomic properties.

Once the desired three-dimensional hearing aid shell design is obtained, various computer-controlled manufacturing methods, such as well known lithographic or laser-based manufacturing methods, are then used to manufacture a physical hearing aid shell conforming to the edited design out of a desired shell material such as, for example, a biocompatible polymer material.

SUMMARY OF THE INVENTION

The present inventors have recognized that, while the aforementioned methods for designing hearing aid shells are advantageous in many regards, they are also disadvantageous in some aspects. In particular, prior attempts at computer-assisted hearing aid manufacturing typically relied on the manual identification of the various features of each ear impression. Once these features were identified for each ear impression, then various editing procedures would be performed on the impression to create an ear mold. However, the manual identification of the various features of each ear impression to be edited was time consuming and costly.

Accordingly, the present inventors have invented an improved method of designing hearing aid molds whereby a point on an ear impression model to be labeled is selected and a shape context is determined for that point. Such a shape context indicates the relative position of the selected point with respect to other points on the surface of the ear impression model. This shape context is then compared to average shape contexts for different regions on a reference ear impression model, also referred to herein as an ear impression shape atlas. A cost function is used to determine the minimum cost between the shape context for the selected point and one of the average shape contexts. Once the minimized cost is determined, the region label corresponding to the average shape context having a minimized cost is assigned to that point. In this way, points on the surface of an ear impression are classified and labeled as being located in regions corresponding to the regions on the ear impression shape atlas.

These and other advantages of the invention will be apparent to those of ordinary skill in the art by reference to the following detailed description and the accompanying drawings.

DETAILED DESCRIPTION

Figure 1A:
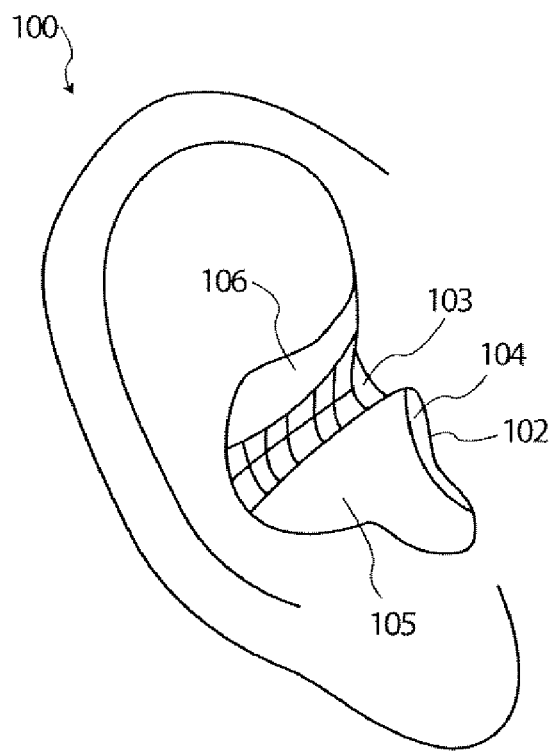
FIG. 1A shows a graphical depiction of an ear of a patient to be fitted with a hearing aid.

The present inventors have recognized that it is desirable to be able to automatically identify the various features of an ear impression in order to improve the design process of hearing aid shells. In particular, given a point cloud representation of an ear impression, such as point cloud representation 201 in FIG. 2, it is desirable to be able to identify the points that lie within different feature areas on the surface of the point cloud representation. These feature areas may be, illustratively, areas that correspond to the different anatomical features of an ear/ear impression, as discussed above in association with FIGS. 1A and 1B.

Figure 3:
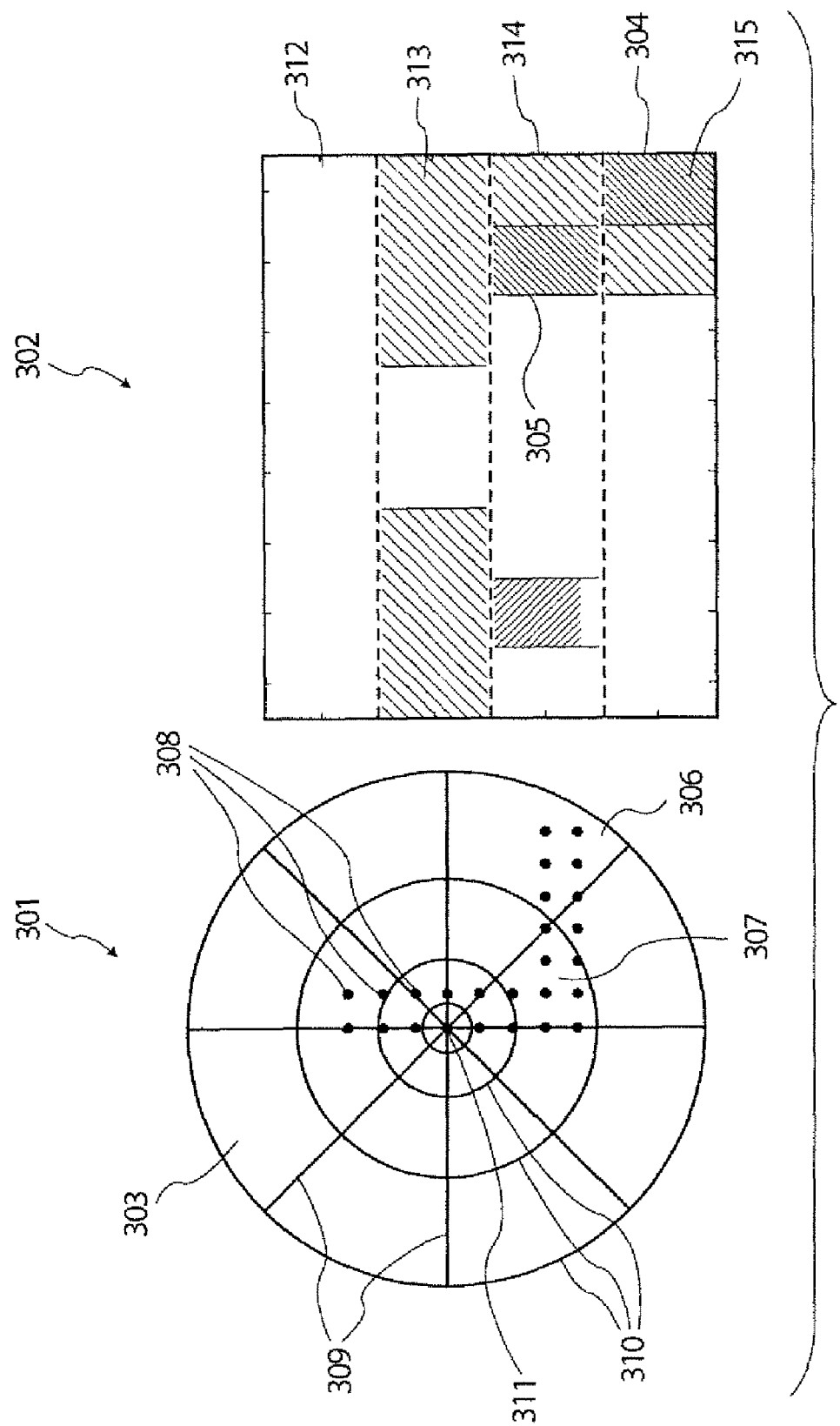
FIG. 3 shows an illustrative log-polar histogram and a corresponding shape context.

Therefore, the present inventors have invented a method and apparatus whereby a reference/example ear impression model, referred to herein as an atlas, is created based on one or more ear impressions. Once this atlas is created, a shape context is then created for each point in a labeled region, such as those regions corresponding to the foregoing anatomical features. Then, the average shape context for each region is obtained by averaging the individual shape contexts obtained from points in that region. More particularly, in order to create a shape context for a point $p_k$ on the surface an object, in accordance with an illustrative embodiment of the present invention, a histogram is first created showing the relationship of all points in the set q of points on the surface of the representation with respect to point $p_k$. FIG. 3 shows one example of an illustrative histogram 301 that can be constructed to produce a shape context 302. As one skilled in the art will recognize, the histogram of FIG. 3 is a log-polar histogram in that it has a log-polar coordinate system. Such log-polar histograms are well known in the art. As shown in the illustrative example of FIG. 3, the coordinate system of histogram 301 is divided by rings 310 and radial lines into 32 bins, consisting eight polar bins (around each ring) and four radial bins (along each radial line). Such log-polar histograms are advantageous for feature identification purposes since they have bins that are uniform in log-polar space. This makes a log-polar description of the relationship between points on a surface especially suitable for applications such as the feature recognition described herein. For simplicity, histogram 301 represents a 2-dimensional (2D) shape. However, one skilled in the art will readily appreciate how to apply the teachings herein to a three-dimensional (3D) shape.

A shape context corresponding to point $p_k$ 311 can be constructed by first binning each point in the set of points q on the surface of the object in terms of the radius r and the angle θ formed between point $p_k$ and the set q of points, calculated as:

$$r = \sqrt{(p_k - q) \cdot (p_k - q)} \qquad \text{Equation 1}$$

and $$\theta = \pi + \arctan\left(\frac{p_{ky} - q_y}{p_{kx} - q_x}\right) \qquad \text{Equation 2}$$

where $p_k=[p_{kx},p_{ky}]^T$ and $q=[q_x,q_y]^T$. As one skilled in the art will recognize, to obtain a log-polar histogram, the log of r is calculated prior to binning the points, thus making the shape context more sensitive to nearby points than points that are farther away. Then, the shape context is produced according to the expression:

$$h_k(\hat{r},\hat{\theta})=\#\{q \neq p_k:(q-p_k) \in \text{bin}(\hat{r},\hat{\theta})\} \qquad \text{Equation 3}$$

where $\hat{r}$ is a log radial bin index and $\hat{\theta}$ is an angular bin index. The result of such binning is log-polar histogram 301, which has a number of bins 303 that are created by the intersection of radial lines 309 with circular rings 310. Once such a log-polar coordinate system has been created, then a point $p_k$ 311 that is on the surface (here, the outline of a 2D shape) is identified. This point is placed at the origin of the log-polar coordinate system of histogram 301 and points 308 of a surface (once again, here, a 2D outline) are plotted according to their spatial relationship with point $p_k$ in log-polar space. As one skilled in the art will recognize, histogram 301 is merely illustrative in nature. As discussed herein above, most 3D shapes, such as ear impressions, for which such histograms will be constructed have significantly more points, such as the illustrative 30,000 points of a typical scanned ear impression model.

Once histogram 301 has been created, in accordance with the present embodiment shape context 302 is then constructed. Specifically, shape context 302 shows the relative density of points in each bin of the log-polar histogram 301. More particularly, each row in the shape context 302 represents a circular ring of bins, with row 315 representing the outer most ring and rows 314, 313 and 312 representing successive rings each closer to the origin of the histogram, respectively, than the next outer-most ring. The relative shade of the blocks in shape context 302 indicate the density of the bins with darker blocks representing denser bins. For example, block 304 corresponds to bin 306, which contains six points. Block 305, which is darker than block 304, corresponds to bin 307, which contains seven points. The other, lighter blocks, correspond to bins where fewer points are present and the white blocks correspond to bins where no points reside. As a result, shape context 302 represents a particular signature context of the entire shape from the perspective of point $p_k$ 311. This same procedure is accomplished for each point in the set q of points on the surface of the object to produce a shape context for each of the points.

Figure 4:
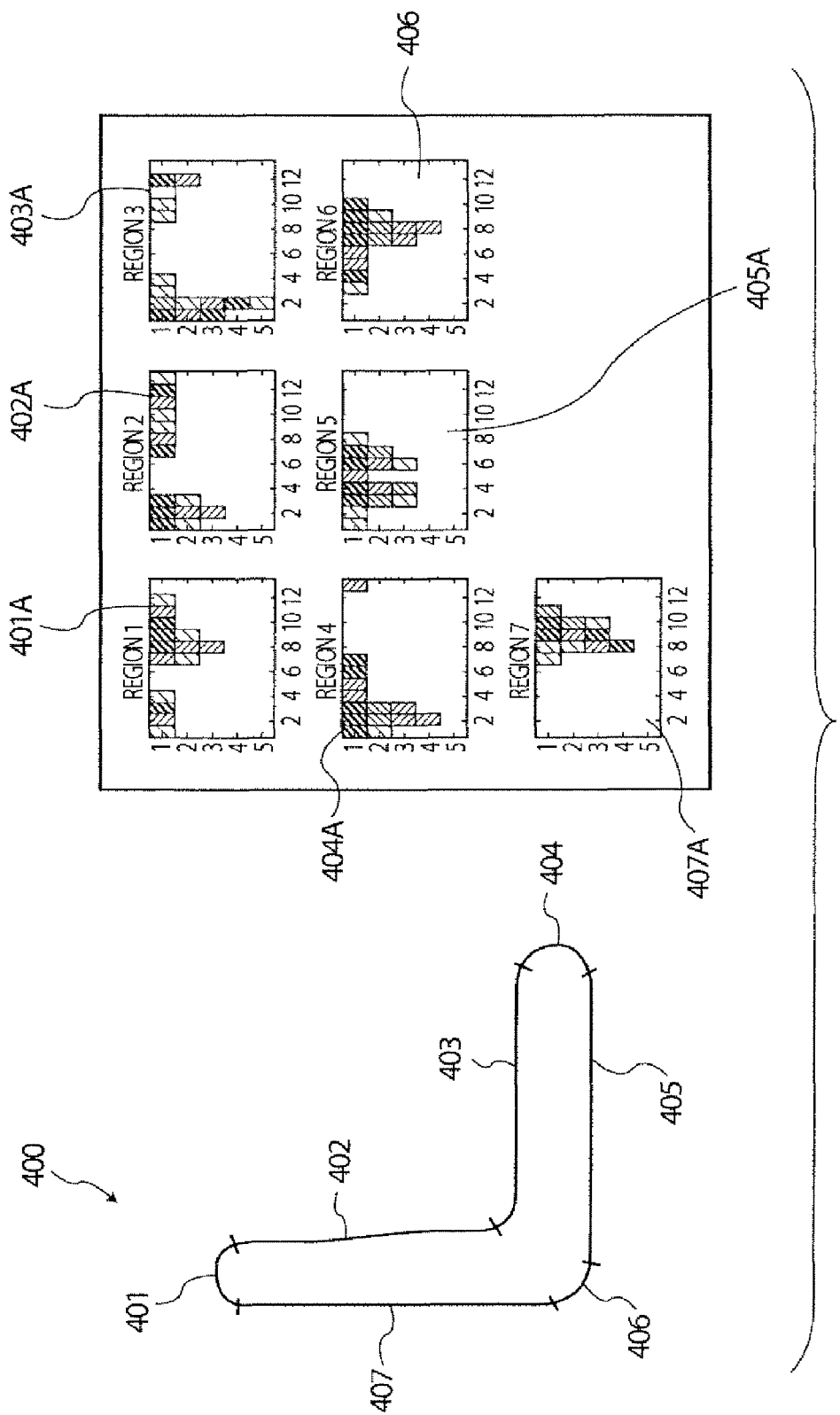
FIG. 4 shows a 2D shape having a plurality of labeled regions and a corresponding plurality of average shape contexts.

Once the individual shape contexts have been created for each of the points on the surface of an object then an average shape context for various features on the object can be determined. FIG. 4 shows average shape contexts for the various regions on an object. Referring to that figure, shape atlas 400 has various labeled regions 401-407 that have been identified.

Figure 1B:
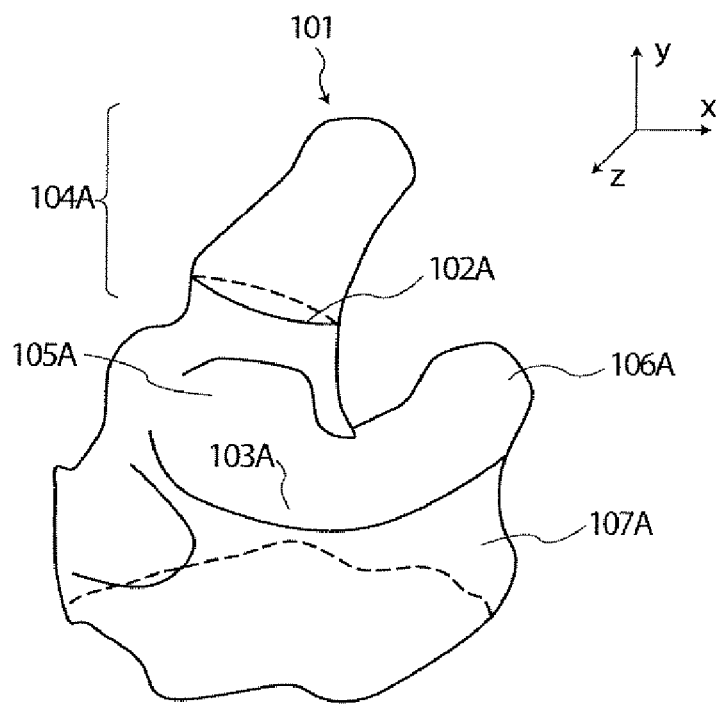
FIG. 1B shows a prior art ear impression taken of the ear of FIG. 1A.
Figure 2:
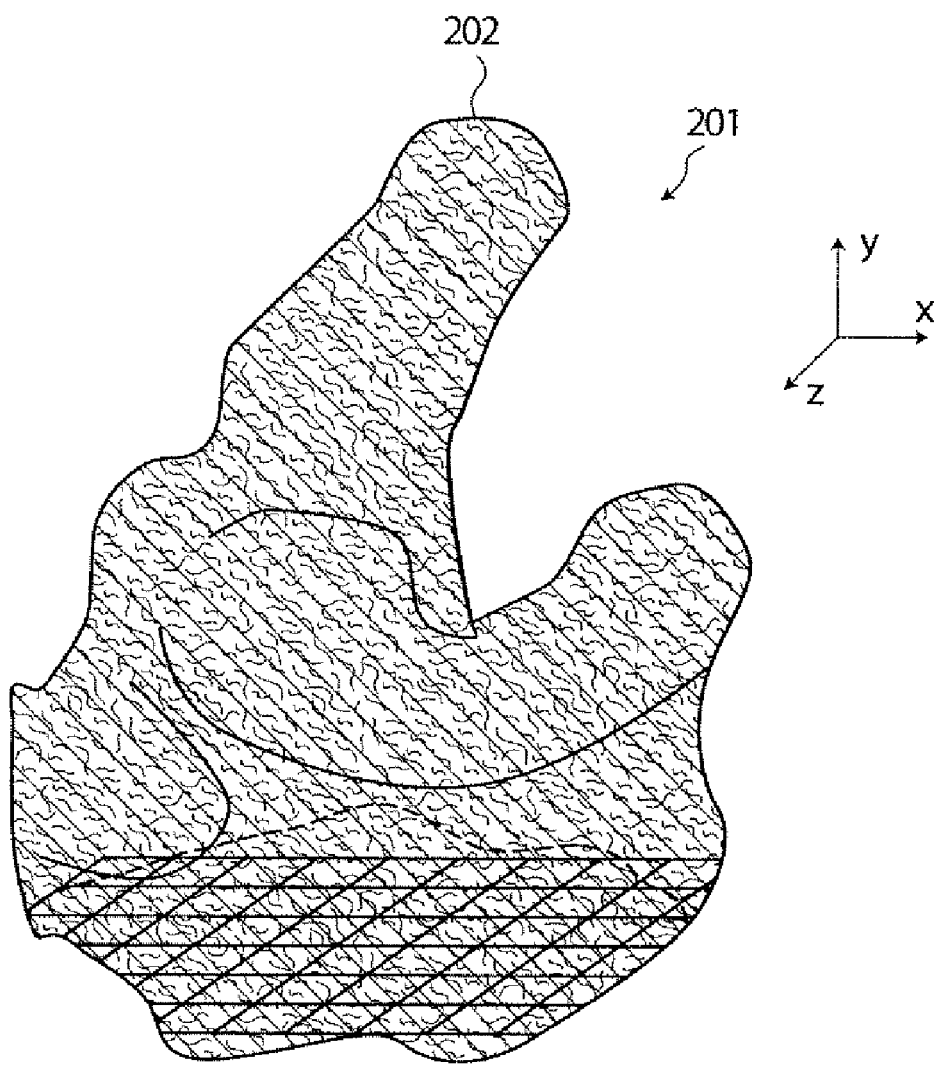
FIG. 2 shows a point cloud representation of the ear impression of FIG. 1B.

In the case of an ear impression, the labeled regions may, for example, correspond to the various anatomical features of the ear impression as shown in FIG. 1B. These regions are, for example, features of a reference ear impression that have been identified manually. For each of these regions, the individual shape contexts (such as shape context 302 of FIG. 3) are averaged together to create average shape contexts 401A-407A, corresponding to regions 401-407, respectively. The blocks in the average shape contexts are created by, for example, averaging the number of points in each block across all points in each labeled region. More specifically, the average shape context for a specific labeled region is calculated according to the expression:

$$H_l = \frac{\sum_{k=1}^{K} h_k}{K}, \forall p_k \in l \qquad \text{Equation 4}$$

where l is the labeled region that contains K points, and $H_l$ is the regional shape context for region l. As can be seen in FIG. 4, the various labeled regions 401-407 are thus characterized by distinct average shape contexts 401A-407A that describe the distribution of points on the surface of an object within each of the labeled regions.

The foregoing discussion assumes a 2D shape and the creation of average shape contexts for each labeled region on the 2D shape. However, similar to creating shape contexts for such a 2D shape, such average shape contexts can also be created for 3D objects, such as ear impressions. Like the 2D example, when considering a 3D shape, the shape context is identified using a log-polar histogram defined by the radius and angle, as shown above in Equations 1 and 2. However, to account for the third dimension, a spherical component $\phi$ is also added to extend the shape context in this third dimension. Accordingly, for a 3D shape, the log-polar histogram is defined by the equations:

$$r = \sqrt{(p_k - q) \cdot (p_k - q)} \qquad \text{Equation 5}$$

$$\theta = \pi + \arctan\left(\frac{p_{ky} - q_y}{p_{kx} - q_x}\right) \qquad \text{Equation 6}$$

and $$\phi = \arccos\left(\frac{p_{kz} - q_z}{r}\right) \qquad \text{Equation 7}$$

where, in three dimensions, $p_k=[p_{kx},p_{ky},p_{kz}]^T$ and $q=[q_x,q_y,q_z]^T$. Similar to the 2D example above, the log of the radius can then be taken and the points can be binned according to the expression:

$$h_k(\hat{r},\hat{\theta},\hat{\phi})=\#\{q \neq p_k:(q-p_k)\in \text{bin}(\hat{r},\hat{\theta},\hat{\phi})\} \qquad \text{Equation 8}$$

where $\hat{r},\hat{\theta}$ are as given above and $\hat{\phi}$ is an angular bin index. In one illustrative embodiment, the radial bins are normalized as a function of an approximation to the maximum distance between any two points. Such an approximation may be achieved, illustratively, by computing twice the distance between the centroid of the 3D object and the point on the object furthest away from the centroid. Referring once again to the log-polar histogram 301 of FIG. 3, that histogram used 8 polar bins and 4 radial bins to generate a shape context. However, one skilled in the art will recognize that various different numbers of polar and radial bins may be used advantageously with a histogram of a 3D model. In one illustrative embodiment, for example, 16 radial bins, 16 θ bins and 16 φ bins may be advantageously used to create a shape context for each point in the various labeled regions of an ear impression.

Figure 5A:
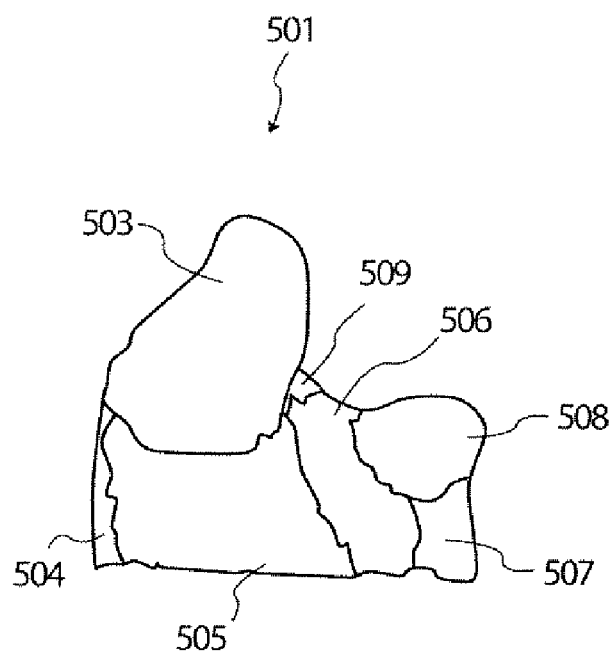
FIGS. 5A and 5B show two views of an illustrative ear impression shape atlas having a plurality of labeled regions.
Figure 5B:
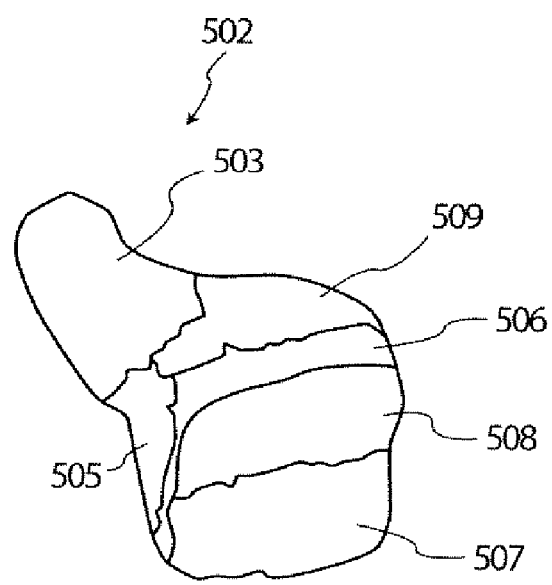

FIGS. 5A and 5B show two different views 501 and 502 of a manually-labeled ear-impression shape atlas having, for example, various features identified as labeled regions. These labeled regions correspond to canal region 503, inter-tragal notch region 504, tragus region 505, cymba region 508, concha region 509, crus region 506, anti-helix region 507, and anti-tragus region (not shown). Once these illustrative regions have been identified and labeled, new, unlabeled ear impression m can then be compared to the shape atlas for the purpose of advantageously identifying corresponding regions on the new ear impression model. In order to accomplish such automatic labeling, each new unlabeled model must first be registered with the shape atlas. The registration of two three-dimensional objects is well-known in the art. Various methods and techniques for the registration of two three-dimensional objects, such as ear impression models, is the subject of copending U.S. patent application Ser. No. 11/462,804, titled Method and Apparatus for the Registration of 3D Ear Impression Models; U.S. patent application Ser. No. 11/462,869, titled Method and Apparatus for Aperture Detection of 3D Hearing Aid Shells; U.S. patent application Ser. No. 11/462,856 titled Method and Apparatus for the Rigid Registration of 3D Ear impression Shapes with Skeletons; and U.S. patent application Ser. No. 11/462,834 titled Method and Apparatus for the Rigid and Non-Rigid Registration of 3D Shapes. Each of these copending U.S. patent applications is hereby incorporated by reference herein in their entirety.

Once the shape contexts for each point in each labeled region on the shape atlas ear impression model have been determined, and once the unlabeled model has been registered with the shape atlas ear impression model, then the various regions on the unlabeled model can be automatically classified. Specifically, the shape context for each point on the surface of the unlabeled ear impression is determined as discussed above using, the illustrative 16 radial bins, 16 θ bins and 16 φ bins to create a three-dimensional shape context for each point. Once a point's shape context is known, it is possible to determine a label for that point by minimizing the $\chi^2$ cost function according to the expression:

$$l(p_k) = \underset{l}{\text{argmin}}(E(h_k, H_l)) \qquad \text{Equation 9}$$

where E is $$E = \frac{1}{2}\sum_m \frac{(h_k(m) - H_l(m))^2}{h_k(m) + H_l(m)}. \qquad \text{Equation 10}$$

and where m is an index corresponding to the dimensions of the shape context; and $H_l$ is as defined above according to Equation 4.

Figure 6A:
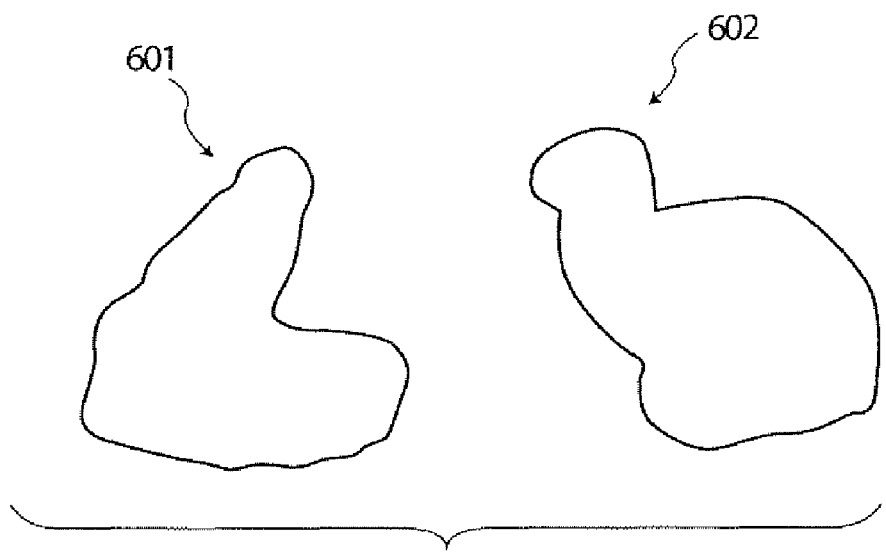
FIG. 6A shows two views of an ear impression model.
Figure 6B:
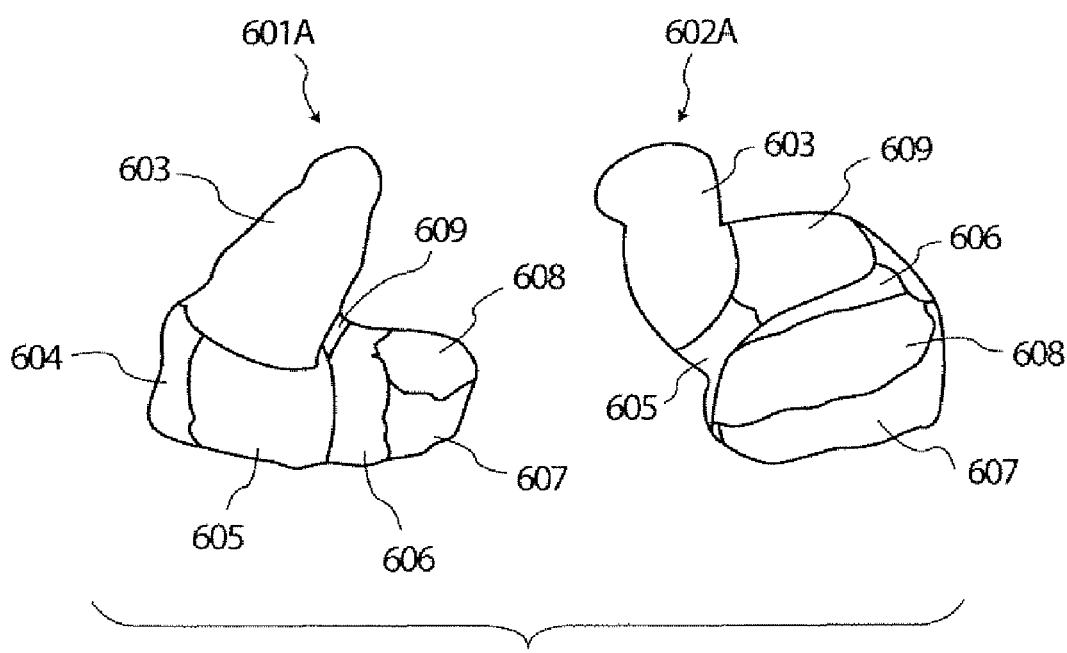
FIG. 6B shows two views of the ear impression model of FIG. 6A having a plurality of regions labeled using the shape atlas of FIGS. 5A and 5B.

FIG. 6A shows two views 601 and 602 of an unlabeled ear impression that is received for the labeling of the various regions on the surface of the ear impression. FIG. 6B shows two corresponding views 601A and 602B in which regions 603-609 are identified by registering the unlabeled ear impression with the shape atlas, generating shape contexts for each point on the unlabeled ear impression, and comparing those shape contexts to the atlas shape contexts to generate. Regions 603-609 correspond, respectively, to regions 503-

509 in FIGS. 5A and 5B, discussed herein above. More particularly canal region 603, inter-tragal notch region 604, tragus region 605, cymba region 608, concha region 609, crus region 606, anti-helix region 607 are identified by the comparing the shape contexts of the points in each of those regions to the average shape contexts for canal region 503, inter-tragal notch region 504, tragus region 505, cymba region 508, concha region 509, crus region 506, anti-helix region 507, respectively, as shown in FIGS. 5A and 5B. As discussed above, once the regions of the shape atlas have been manually labeled and average shape contexts have been generated for each of the labeled regions, then the registration of the unlabeled shape with the shape atlas, the determination of shape contexts for each point on the surface of the unlabeled shape, and the classification of each point into one of the labeled regions can be accomplished automatically. In this way, regions on ear impression models, such as those obtained from 3D laser scanning, can be classified and labeled without the time-consuming manual labeling of those regions that was previously required.

Figure 7A:
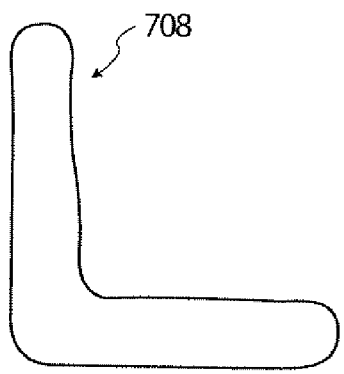
FIGS. 7A-7F show how an illustrative shape atlas of a 2D shape can be used to label regions on a new 2D shape and how those labels can be refined using partial differential equations.
Figure 7B:
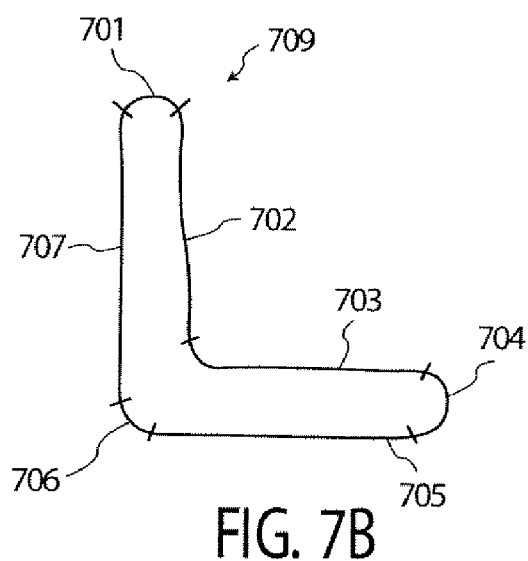
Figure 7C:
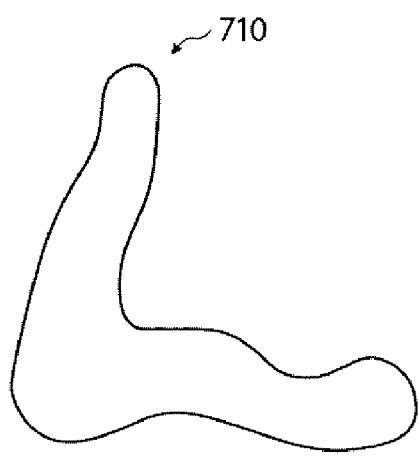
Figure 7D:
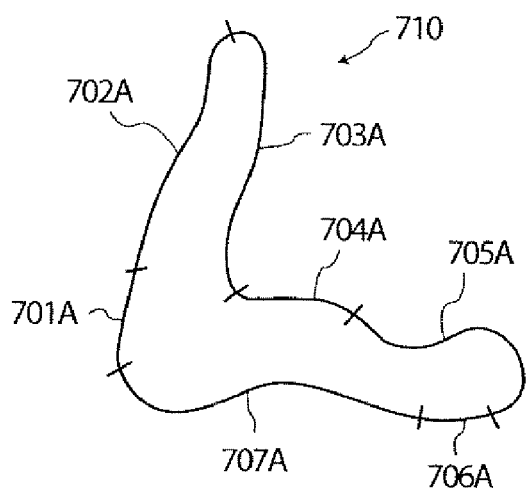
Figure 7E:
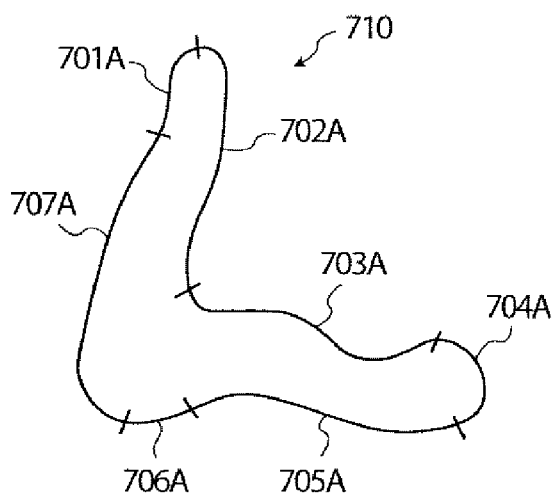
Figure 7F:
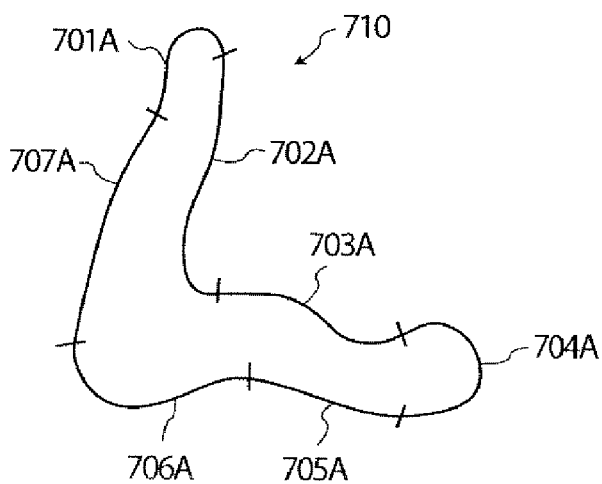

One skilled in the art will recognize that the number of regions identified on the classified surface might not match the number of regions on the shape atlas, possibly reflecting misclassifications of certain regions. In such cases, partial differential equations may be used to update the boundaries between different regions and to remove such misclassifications. Such an application of partial differential equations is most simply described by reference to 2D shapes, such as the 2D shapes of FIGS. 7A-7F. One skilled in the art will appreciate in light of the teachings herein how such a technique can be applied to a 3D object such as an ear impression model FIGS. 7A and 7B show an unlabeled shape atlas 708 and a labeled shape atlas 709, respectively. The labeled shape atlas 709 of FIG. 7B has labeled regions 701-707 that have been manually labeled as discussed herein above, FIG. 7C shows an illustrative new 2D shape 710 for which labeling is desired. Assume that an initial automatic labeling of shape 710 using the methods described herein above results in labeled regions 701A-707A being located on shape 710, corresponding to shape atlas labeled regions 701-707, respectively. One skilled in the art will recognize that the positions of the labels of FIG. 7D do not match the positions of the labels of FIG. 7B (i.e., label 701A is in the lower left portion of shape 710 of FIG. 7D, while corresponding label 701 is located at the top portion of shape 709).

Accordingly, in order to improve the match between labels, the label boundaries must be moved in order to reduce the cost as calculated by Equations 9 and 10. This may be accomplished by taking the derivative of Equation 10 with respect to the label L on surface I, resulting in the partial differential equation:

$$\frac{\partial L}{\partial t} = \frac{\partial E}{\partial L} = \frac{1}{2}\sum_m \left[ \frac{2(h_k(m) - H_l(m))}{h_k(m) + H_l(m)} \frac{\partial h_k}{\partial L} - \frac{(h_k(m) - H_l(m))^2}{(h_k(m) + H_l(m))^2} \frac{\partial h_k}{\partial L} \right]$$

Equation 11 where the variables are as described herein above. As one skilled in the art will recognize in light of the forgoing, the term $\partial h_k/\partial L$ can be computed using central differences. Initially, in order to minimize the costs, all labels are moved together along the surface of the object in an attempt to achieve global optimization. Specifically, each label edge contributes a $\partial L/\partial t$ term that is averaged and all labels are moved the same amount until convergence is achieved. Performing this optimization results in, illustratively, the labels 701A-707A moving to the positions shown in FIG. 7E which, as one skilled in the art will recognize, is closer to the labels on shape atlas 709 of FIG. 7B. However, label 701A still is not at the top portion of the object as is the case of label 701 of shape atlas 709 and, thus, there is a limit to the global optimization possible using this method. However, by applying Equation 11 to each label edge individually, a local refinement of the label boundaries results, as shown illustratively in FIG. 7F. As one skilled in the art will recognize, the positions of the labels match much more closely the positions of the labels on shape 709 in FIG. 7B.

Figure 8:
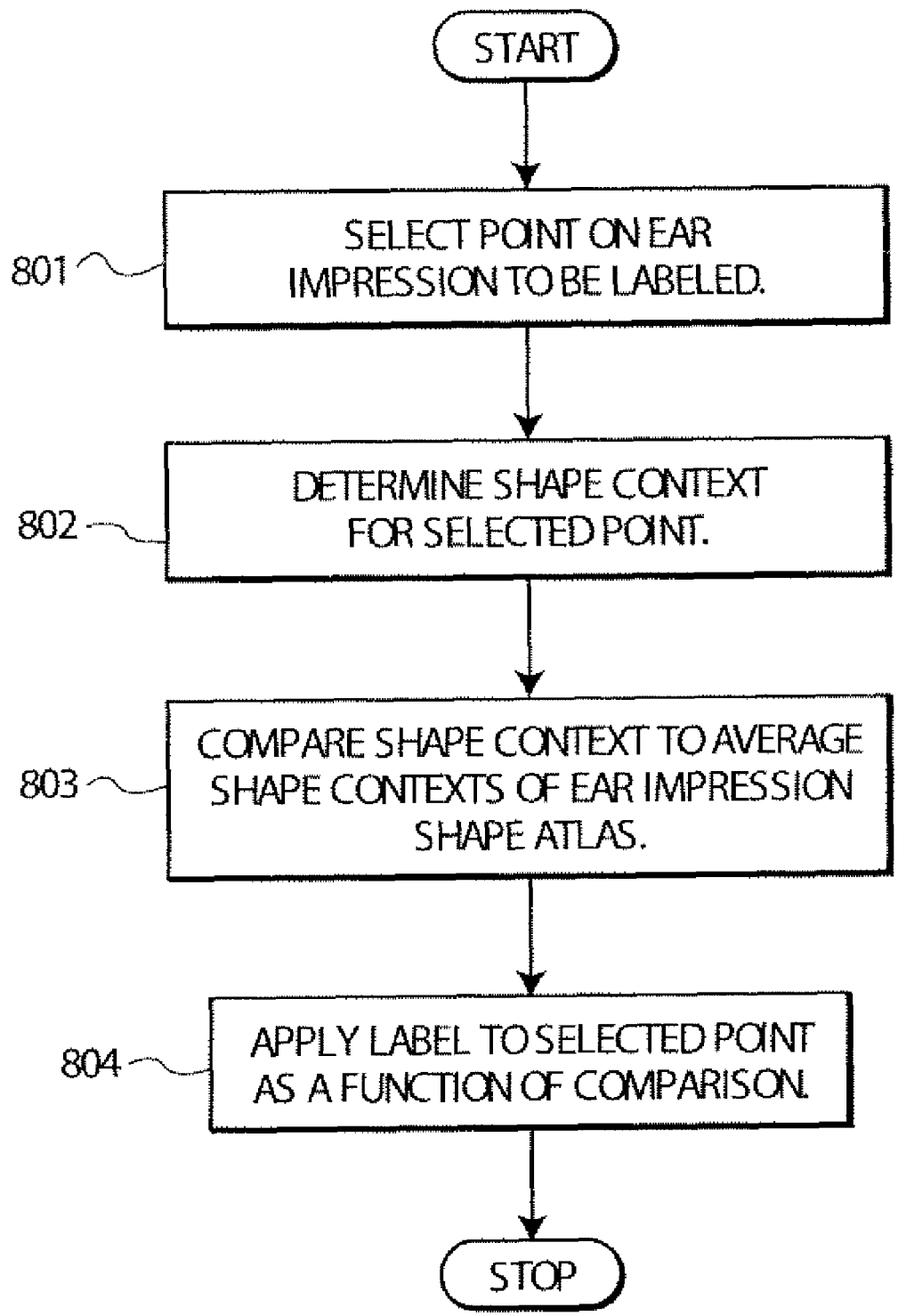
FIG. 8 is a flow chart showing the steps of a method in accordance with an embodiment of the present invention.

FIG. 8 shows a method in accordance with one embodiment of the present invention. Referring to that figure at step 801, a point on an ear impression to be labeled is selected. Then, at step 802, a shape context is determined for that selected point. Next, at step 803, this shape context is compared to average shape contexts identified for individual regions on an ear impression shape atlas. Illustratively this comparison is conducted by minimizing a cost difference between the shape context for the selected point and the average shape contexts. Then, at step 804, a label corresponding to the average shape context having the minimum cost difference is applied to the shape context for the selected point.

Variations on the foregoing method and description can be accomplished to potentially improve the classification and labeling of the regions of an ear impression model. Specifically, in accordance with one embodiment of the present invention, in addition to the basic shape context discussed herein above, other surface properties may be used to improve the classification and labeling process. For example, the curvature of the surface sampled at various resolutions may provide a more detailed description of the surface. The average curvature can be calculated for each point according to the equation:

$$K = p - \left[\frac{1}{N}\sum_{i=1}^{N} p_i\right]$$

Equation 12 where p is a central point and $p_i$ is the current point in a ring of N points adjacent to p. As with the general shape context discussed herein above, the curvature of Equation 11 would be calculated for each point and then averaged for each labeled region. Such additional descriptors of the shape could in some illustrative instances improve the accuracy of the labeling of regions. In another illustrative embodiment, other shape descriptors can be used, such as the normal of the surface in a region. One skilled in the art will recognize that the use of such a normal would be most beneficial over regions having a relatively small area since the average normal would best represent a label with a small variance in the normal vector.

One skilled in the art will also recognize that other variations on the above described methods are possible. For example, another possible classifying method could incorporate the label variation into the cost minimization of Equations 9 and 10. In such a case, the average shape context may be computed for each label according to the equation:

$$\hat{\mu} = \frac{1}{n}\sum_{k=1}^{n} h_k \quad \text{Equation 13}$$

where there are n total points in the label and $h_k$ denotes a shape context for point k. Next, the label's variance is calculated using the average shape context of Equation 13 according to the expression:

$$\sigma = \sqrt{\frac{1}{n}\sum_{k=1}^{n}(h_k - \hat{\mu})^2} \,. \quad \text{Equation 14}$$

Finally, both Equations 13 and 14 are incorporated into a cost function:

$$r^2 = \left(\sum_{m=1}^{d}\left(\frac{h_k - \mu_{m2}}{\sigma_m}\right)\right)^2 \quad \text{Equation 15}$$

where $r^2$ is the squared Mahalanobis distance; $h_k$ is the shape context of the current vertex on the unlabeled shell; $\mu_{m2}$ is the $m^{th}$ bin of the average shape context; and $\sigma_m$ is its corresponding variance. One skilled in the art will recognize that the Mahalanobis distance is a well known characterization of a distance that is an especially useful way of determining similarity of an unknown sample set to a known one. As one skilled in the art will recognize, Mahalanobis distance differs from Euclidean distance in that it takes into account the correlations of the data set and is scale-invariant, i.e. not dependent on the scale of measurements.

Figure 9:
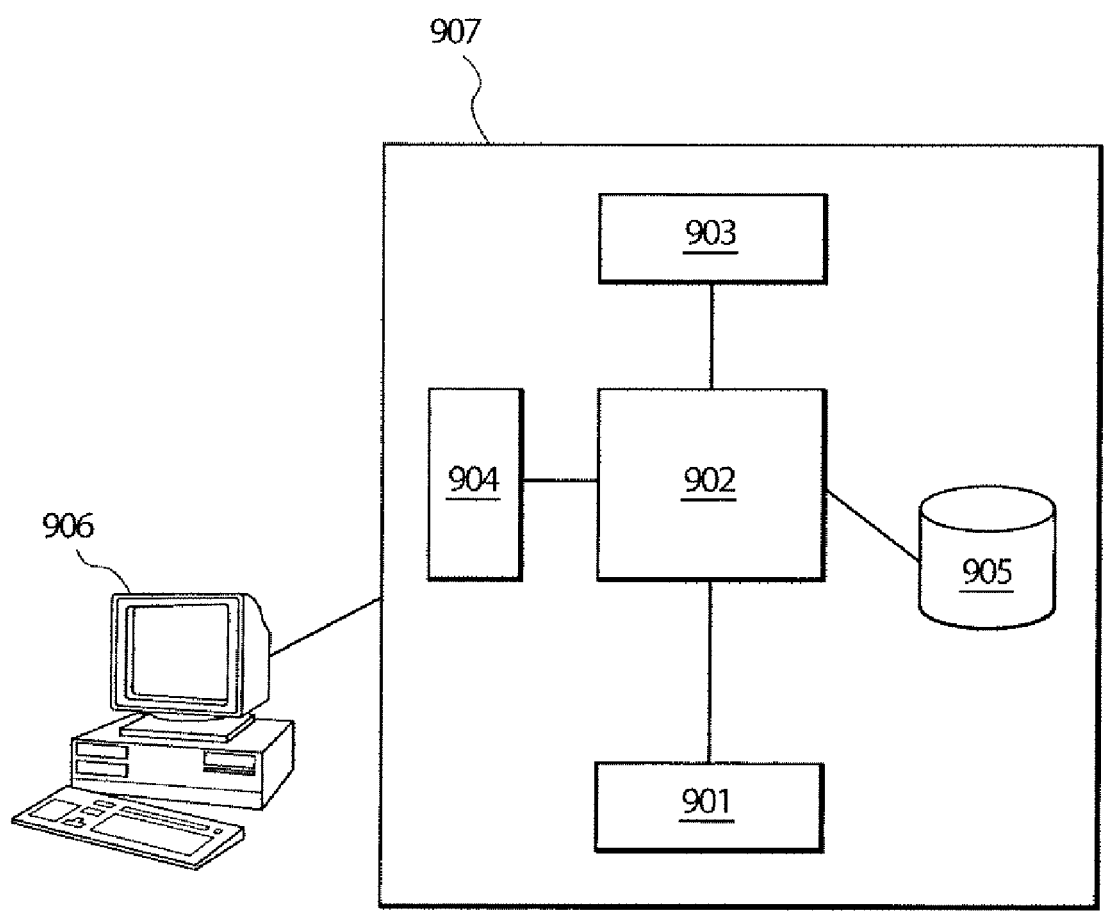
FIG. 9 shows a computer adapted to perform the illustrative steps of the method of FIG. 8 as well as other functions associated with the labeling of regions of ear impression models.

The foregoing embodiments are generally described in terms of identifying and manipulating objects, such as points on the surface of an ear impression, to identify which feature corresponds to the points on that surface. One skilled in the art will recognize that such manipulations may be, in various embodiments, virtual manipulations accomplished in the memory or other circuitry/hardware of an illustrative registration system. One skilled in the art will recognize that such manipulations may be, in various embodiments, virtual manipulations accomplished in the memory or other circuitry/hardware of an illustrative computer aided design (CAD) system. Such a CAD system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 9. Referring to that figure, a CAD system 907 is implemented on a suitable computer adapted to receive, store and transmit data such as the aforementioned feature information associated a point cloud representation of an ear impression. Specifically, illustrative CAD system 907 may have, for example, a processor 902 (or multiple processors) which controls the overall operation of the CAD system 907. Such operation is defined by computer program instructions stored in a memory 903 and executed by processor 902. The memory 903 may be any type of computer readable medium, including without limitation electronic, magnetic, or optical media. Further, while one memory unit 903 is shown in FIG. 9, it is to be understood that memory unit 903 could comprise multiple memory units, with such memory units comprising any type of memory. CAD system 907 also comprises illustrative modem 901 and network interface 904. CAD system 907 also illustratively comprises a storage medium, such as a computer hard disk drive 905 for storing, for example, data and computer programs adapted for use in accordance with the principles of the present invention as described hereinabove. Finally, CAD system 907 also illustratively comprises one or more input/output devices, represented in FIG. 9 as terminal 906, for allowing interaction with, for example, a technician or database administrator. One skilled in the art will recognize that CAD system 907 is merely illustrative in nature and that various hardware and software components may be adapted for equally advantageous use in a computer in accordance with the principles of the present invention.

One skilled in the art will also recognize that the software stored in the computer system of FIG. 9 may be adapted to perform various tasks in accordance with the principles of the present invention. In particular, such software may be graphical software adapted to import surface models of shapes, for example those models generated from three-dimensional laser scanning of objects. In addition, such software may allow for the automatic comparison of the features of one ear impression, such as a shape atlas, with a second ear impression to automatically identify the features on the second ear impression. The software of a computer-based system such as CAD system 907 may also be adapted to perform other functions which will be obvious in light of the teachings herein. All such functions are intended to be contemplated by these teachings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   determining a shape context of a point on a surface of a scanned ear impression model;
   comparing said shape context with each of a plurality of average shape contexts of an ear impression shape atlas, wherein said ear impression shape atlas is a reference ear impression having a plurality of labeled regions corresponding to a plurality of anatomic features, and each of said plurality of average shape contexts is determined as an average of individual shape contexts determined for a plurality of points in a corresponding one of said plurality of labeled regions on said ear impression shape atlas; and
   determining as a function of said step of comparing that said point on said surface of said ear impression model is within a region on said surface of said ear impression model corresponding to one of said plurality of labeled regions on said ear impression shape atlas.

2. The method of claim 1 wherein said step of comparing comprises minimizing a cost between said shape context and said plurality of average shape contexts.

3. The method of claim 2 wherein said cost is determined according to the function:

$$l(p_k) = \underbrace{\arg\min}_{l}(E(h_k, H_l))$$

where l is a labeled region, $p_k$ is said point on said ear impression model; $H_l$ is an average shape context for region l; $h_k$ is said shape context on said ear impression model; and E is defined by the expression $$E = \frac{1}{2} \sum_m \frac{(h_k(m) - H_l(m))^2}{h_k(m) + H_l(m)};$$

and m is an index corresponding to the dimensions of the shape context.

4. The method of claim 1 wherein said step of determining a shape context comprises:
   identifying said point on said surface of said ear impression model;
   determining the locations of a plurality of points on said surface of said ear impression model; and
   determining the relative distance of each point in said plurality of points on said surface of said ear impression model to said point on said surface of said ear impression model.

5. The method of claim 4 wherein said step of determining the relative distance comprises determining the location of each point in said plurality of points on said surface of said ear impression model in log-polar coordinates relative to said point on said surface of said ear impression model.

6. The method of claim 1 further comprising:
   refining a location of said region on said surface of said ear impression model as a function of an average curvature of said region on said surface of said ear impression model.

7. The method of claim 1 further comprising:
   determining a variance associated with said region on said surface of said ear impression model; and
   refining a location of said region on said surface of said ear impression model as a function of said variance.

8. An apparatus comprising:
   means for determining a shape context of a point on a surface of a first object;
   means for comparing said shape context with each of a plurality of average shape contexts of a second object, wherein said second object comprises a plurality of labeled regions, and each of said plurality of average shape contexts is determined as an average of individual shape contexts determined for a plurality of points in a corresponding one of said plurality of labeled regions on said second object; and
   means for determining, as a function of the comparison of said shape context with said plurality of average shape contexts, that said point on said surface of said first object is within a first region, said first region corresponding to one of said plurality of labeled regions on said second object.

9. The apparatus of claim 8 wherein said means for comparing comprises means for minimizing a cost between said shape context and said plurality of average shape contexts.

10. The apparatus of claim 9 wherein said means for minimizing a cost comprises means for calculating said cost according to the function:

$$l(p_k) = \underbrace{\mathrm{argmin}}_{l}(E(h_k, H_l))$$

where l is a labeled region, $p_k$ is said point on said first object; $H_l$ is an average shape context for region l; $h_k$ is said shape context on said first object; and E is defined by the expression $$E = \frac{1}{2} \sum_m \frac{(h_k(m) - H_l(m))^2}{h_k(m) + H_l(m)};$$

and m is an index corresponding to the dimensions of the shape context.

11. The apparatus of claim 8 wherein said means for determining a shape context comprises:
   means for identifying said point on said surface of said first object;
   means for determining the locations of a plurality of points on said surface of said first object; and
   means for determining the relative distance of each point in said plurality of points on said surface of said first object to said point on said surface of said first object.

12. The apparatus of claim 11 wherein said means for determining the relative distance comprises means for determining the location of each point in said plurality of points on said surface of said first object in log-polar coordinates relative to said point on said surface of said first object.

13. The apparatus of claim 8 wherein said first object is an ear impression.

14. The apparatus of claim 8 wherein said second object is an ear impression shape atlas.

15. The apparatus of claim 14 wherein said ear impression shape atlas comprises a reference ear impression having a plurality of labeled regions.

16. The apparatus of claim 15 wherein said plurality of labeled regions corresponds to a plurality of anatomical features of said reference ear impression.

17. The apparatus of claim 8 further comprising:
   means for refining a location of said first region as a function of an average curvature of said first region.

18. The apparatus of claim 8 further comprising:
   means for determining a variance associated with said first region; and
   means for refining a location of said first region as a function of said variance.

19. A non-transitory computer readable medium comprising computer program instructions which, when executed by a processor, define steps comprising:
   determining a shape context of a point on a surface of a first object;
   comparing said shape context with each of a plurality of average shape contexts of a second object, wherein said second object comprises a plurality of labeled regions, and each of said plurality of average shape contexts is determined as an average of individual shape contexts determined for a plurality of points in a corresponding one of said plurality of labeled regions on said second object; and
   determining as a function of said step of comparing that said point on said surface of said first object is within a first region, said first region corresponding to one of said plurality of labeled regions on said second object.

20. The non-transitory computer readable medium of claim 19 wherein said computer program instructions defining the step of comparing comprise computer program instructions for minimizing a cost between said shape context and said plurality of average shape contexts.

21. The non-transitory computer readable medium of claim 20 wherein said computer program instructions for minimizing a cost comprise computer program instructions for determining a cost according to the function:

$$l(p_k) = \underset{l}{\operatorname{argmin}}(E(h_k, H_l))$$

where l is a labeled region, $p_k$ is said point on said first object; $H_l$ is an average shape context for region l; $h_k$ is said shape context on said first object; and E is defined by the expression $$E = \frac{1}{2}\sum_m \frac{(h_k(m) - H_l(m))^2}{h_k(m) + H_l(m)};$$

and m is an index corresponding to the dimensions of the shape context.

22. The non-transitory computer readable medium of claim 19 wherein said computer program instructions for determining a shape context comprise computer program instructions for performing the steps of:

identifying said point on said surface of said first object;

determining the locations of a plurality of points on said surface of said first object; and determining the relative distance of each point in said plurality of points on said surface of said first object to said point on said surface of said first object.

23. The non-transitory computer readable medium of claim 22 wherein said computer program instructions for determining the relative distance comprise computer program instructions for determining the location of each point in said plurality of points on said surface of said first object in log-polar coordinates relative to said point on said surface of said first object.

24. The non-transitory computer readable medium of claim 19 wherein said first object is an ear impression.

25. The non-transitory computer readable medium of claim 19 wherein said second object is an ear impression shape atlas.

26. The non-transitory computer readable medium of claim 25 wherein said ear impression shape atlas comprises a reference ear impression having a plurality of labeled regions.

27. The non-transitory computer readable medium of claim 26 wherein said plurality of labeled regions corresponds to a plurality of anatomical features of said reference ear impression.

28. The non-transitory computer readable medium of claim 19 further comprising computer program instructions for performing the step of:

refining a location of said first region as a function of an average curvature of said first region.

29. The non-transitory computer readable medium of claim 19 further comprising computer program instructions which, when executed on a processor, define the steps of:

determining a variance associated with said first region; and refining a location of said first region as a function of said variance.

* * * * *